United States Patent [19]
Liao

[11] Patent Number: 5,848,863
[45] Date of Patent: Dec. 15, 1998

[54] WORKING MACHINE HAVING DIFFERENT WORKING ANGLE

[76] Inventor: Bi Hu Liao, No. 63-11, An Mei Road, Gong Guan Tsuen, Hou Li Hsiang, Taichung Hsien, Taiwan

[21] Appl. No.: 868,828

[22] Filed: Jun. 9, 1997

[51] Int. Cl.$^6$ ....................................................... B23C 1/00
[52] U.S. Cl. .......................... 409/203; 408/128; 409/144; 409/215; 409/230
[58] Field of Search .................................. 409/144, 203, 409/215, 217, 230, 235; 408/128

[56] References Cited

U.S. PATENT DOCUMENTS

| | | | |
|---|---|---|---|
| 2,072,646 | 3/1937 | Ocenasek | 408/128 |
| 2,294,231 | 8/1942 | Graves | 408/128 |
| 2,473,963 | 6/1949 | McKelvey | 408/128 |
| 2,604,019 | 7/1952 | Malnar | 409/144 |
| 3,230,837 | 1/1966 | Chiaia | 409/215 |
| 4,993,138 | 2/1991 | Yang | 409/144 |
| 5,628,594 | 5/1997 | Fetty | 409/203 |

*Primary Examiner*—Daniel W. Howell
*Assistant Examiner*—Adesh Bhargava

[57] ABSTRACT

A working machine includes a base having a working table for supporting a work piece and having a tool disposed on top for moving downward to machine the work piece. A block is secured to the base and has another tool for being selectively rotated to machine the side portion of the work piece. The another tool may be selectively driven by a motor which may drive the tool for moving downward to machine the work piece. The block has a screw driven slide to engage with the track and includes two followers for allowing the block to be secured to different vertical tracks.

5 Claims, 8 Drawing Sheets

WORKING MACHINE HAVING DIFFERENT WORKING ANGLE

BACKGROUND OF THE INVENTION

1. Field of the Invention

The present invention relates to a working machine, and more particularly to a working machine having different working angles.

2. Description of the Prior Art

Typical working machines, particularly the milling machine and planer, comprise a working table for supporting the work pieces and a cutting tool disposed above the working table for moving downward to engage with and to machine the work piece. However, the cutting tools may normally be moved upward and downward for machining the upper portion of the work piece. No other tools may be used for machining the side portion of the work piece, such that the work piece should be rotated for turning the side portion upward and for allowing the side portions to be machined by the cutting tool. However, the work piece is normally heavy and may not be easily turned. In addition, a number of fasteners are required to be loosened and fastened again and again for working a single work piece. Or the work piece should be moved to another working machine for machining the side portions. Then, two or more working machines are required. This may greatly increase the expenses of the user.

The present invention has arisen to mitigate and/or obviate the afore-described disadvantages of the conventional working machines.

SUMMARY OF THE INVENTION

The primary objective of the present invention is to provide a working machine which includes another tool for selectively machining the side portion of the work piece.

In accordance with one aspect of the invention, there is provided a working machine comprising a base including a working table for supporting a work piece and including a first tool provided on top and adapted to move downward for machining the work piece, means for actuating the first tool to machine the work piece, a block secured to the base and including a housing, the housing including a second tool, and means for selectively driving the second tool and for allowing the second tool to machine a side portion of the work piece.

The housing includes a horizontal rod for securing the second tool, the housing includes a vertical rod coupled to the horizontal rod for allowing the vertical rod to rotate the horizontal rod, and the selectively driving means is provided for driving the vertical rod.

The actuating means includes a motor provided on the top of the base and includes a securing member coupled to the motor for securing the first tool and for allowing the first tool to be actuated by the motor, the selectively driving means includes a first pulley for securing to the securing member of the actuating means and includes a second pulley secured to the vertical rod and includes means for coupling the first pulley and the second pulley and for allowing the second tool to be driven by the motor.

The base includes a front portion having a vertical track, the block includes a slot for slidably engaging with the vertical track and for allowing the block to be adjusted upward and downward.

The slot includes a first end and a second end, the block includes a slide slidably engaged in the second end of the slot, and means for forcing the slide toward the first end of the slot and for securing the block to the vertical track.

The block includes two followers rotatably engaged in the slide and the first end of the slot for engaging with the vertical track and for allowing the block to be secured to different vertical tracks.

The slide and the block each includes a curved recess, the followers each includes a curved portion for engaging with the curved recesses and for allowing the followers to be rotated relative to the block.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
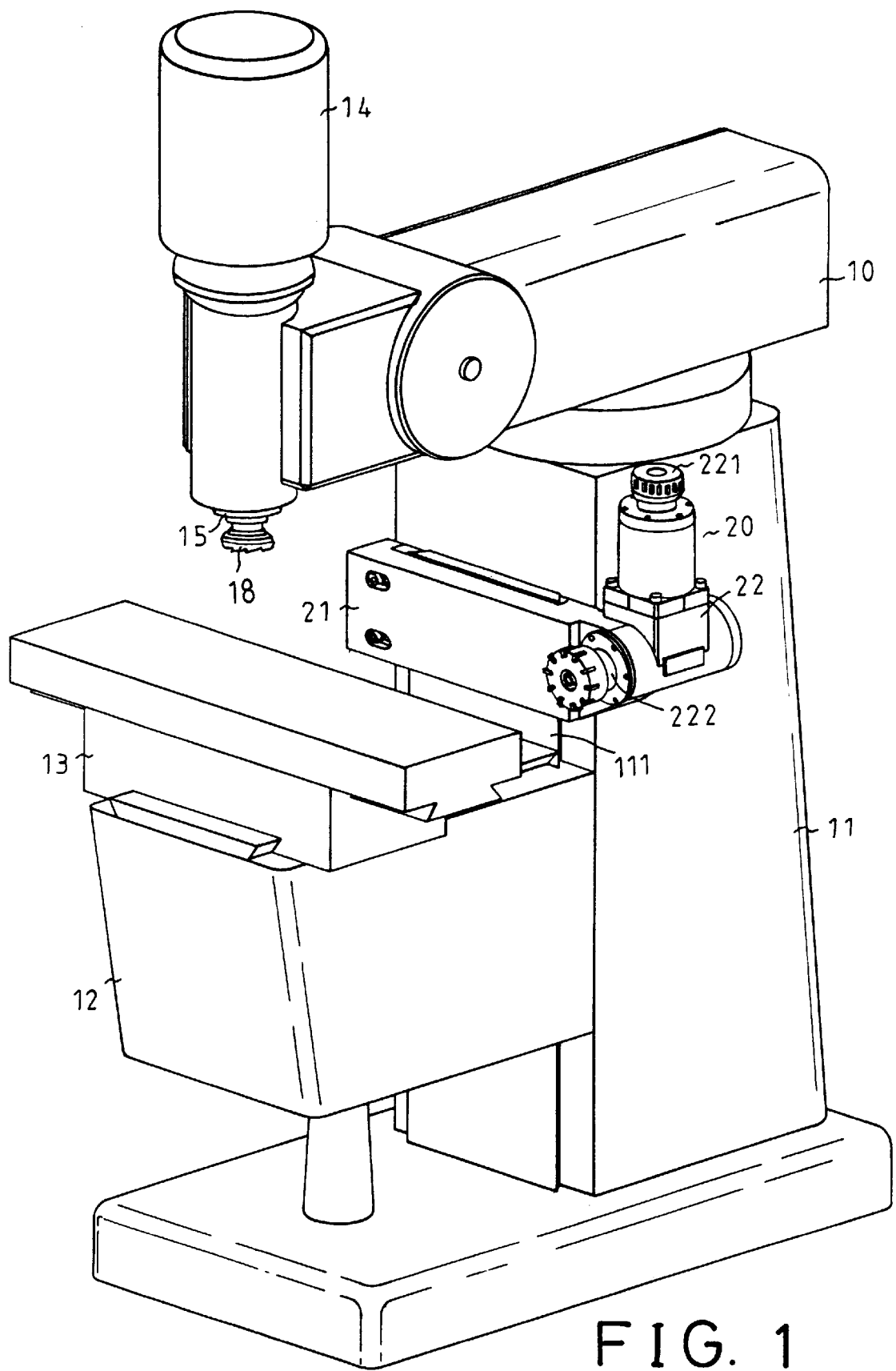
FIGS. 1 and 2 are perspective views of a working machine in accordance with the present invention.
Figure 2:
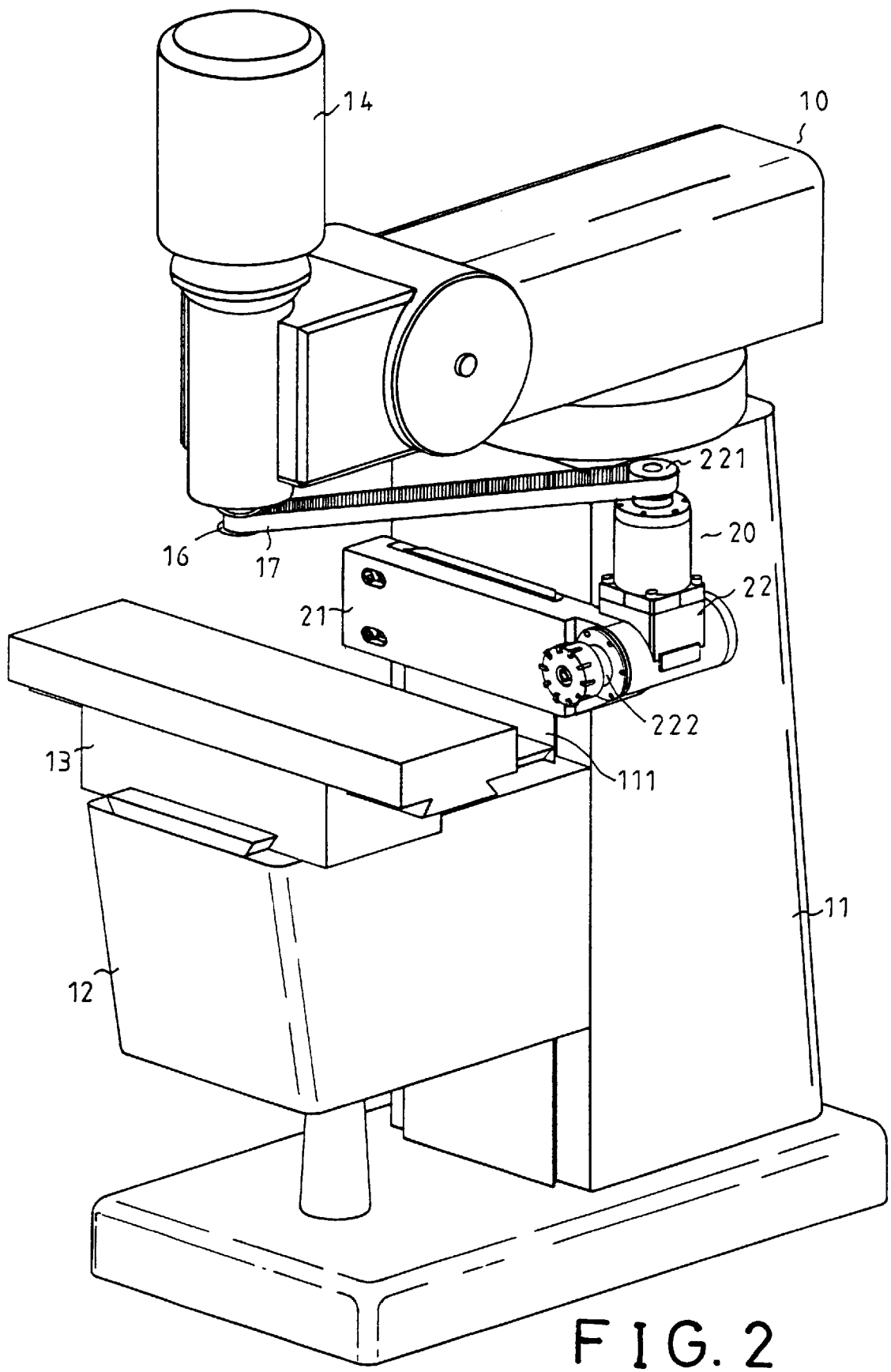
Figure 3:
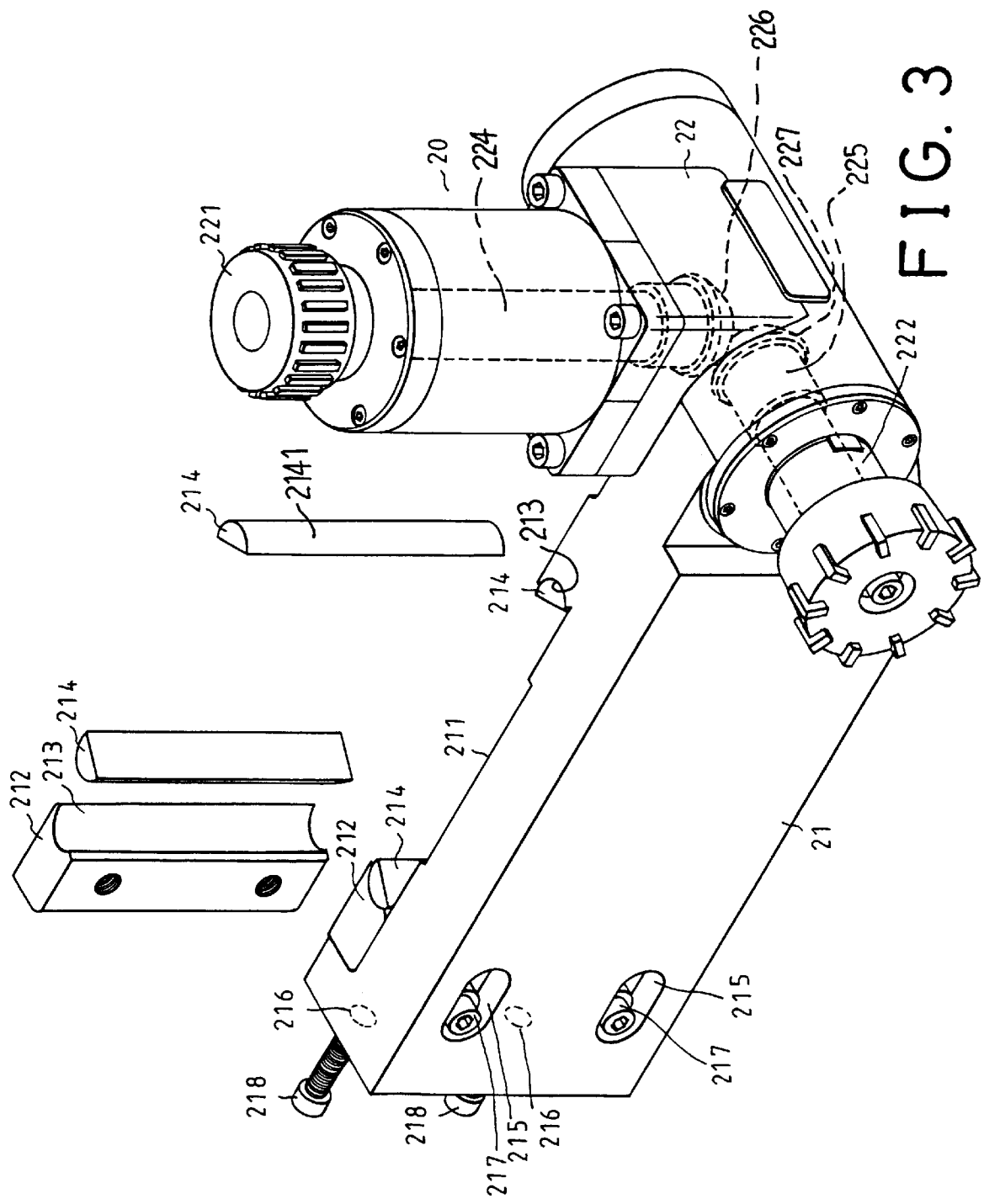
FIG. 3 is a partial exploded view of the transmission mechanism.

Referring to the drawings, and initially to FIGS. 1 and 2, a working machine 10 in accordance with the present invention may be a milling machine or a planer or other working machine having a cutting tool for machining the work pieces. The working machine 10 comprises a base 11 including track, such as a dovetail 111 vertically provided in the front portion for slidably engaging with a support 12 and for allowing the support 12 to be moved upward and downward to suitable position. The support 12 is provided for supporting a working table 13 which is preferably movable forward and rearward and leftward and rightward and which is typical and will not be described in further details. The working machine 10 includes a motor 14 provided on top and includes a securing member, such as a chuck 15 coupled to the motor 14 for securing a tool 18 and for allowing the motor 14 to drive and to rotate the tool 18. The tool 18, such as a cutting, drilling or milling tool 18 may thus be moved downward for machining the working piece supported on the working table 13. The chuck 15 may also be used for engaging with a pulley 16 (FIG. 2) which may be engaged with a transmission belt 17.

Figure 4:
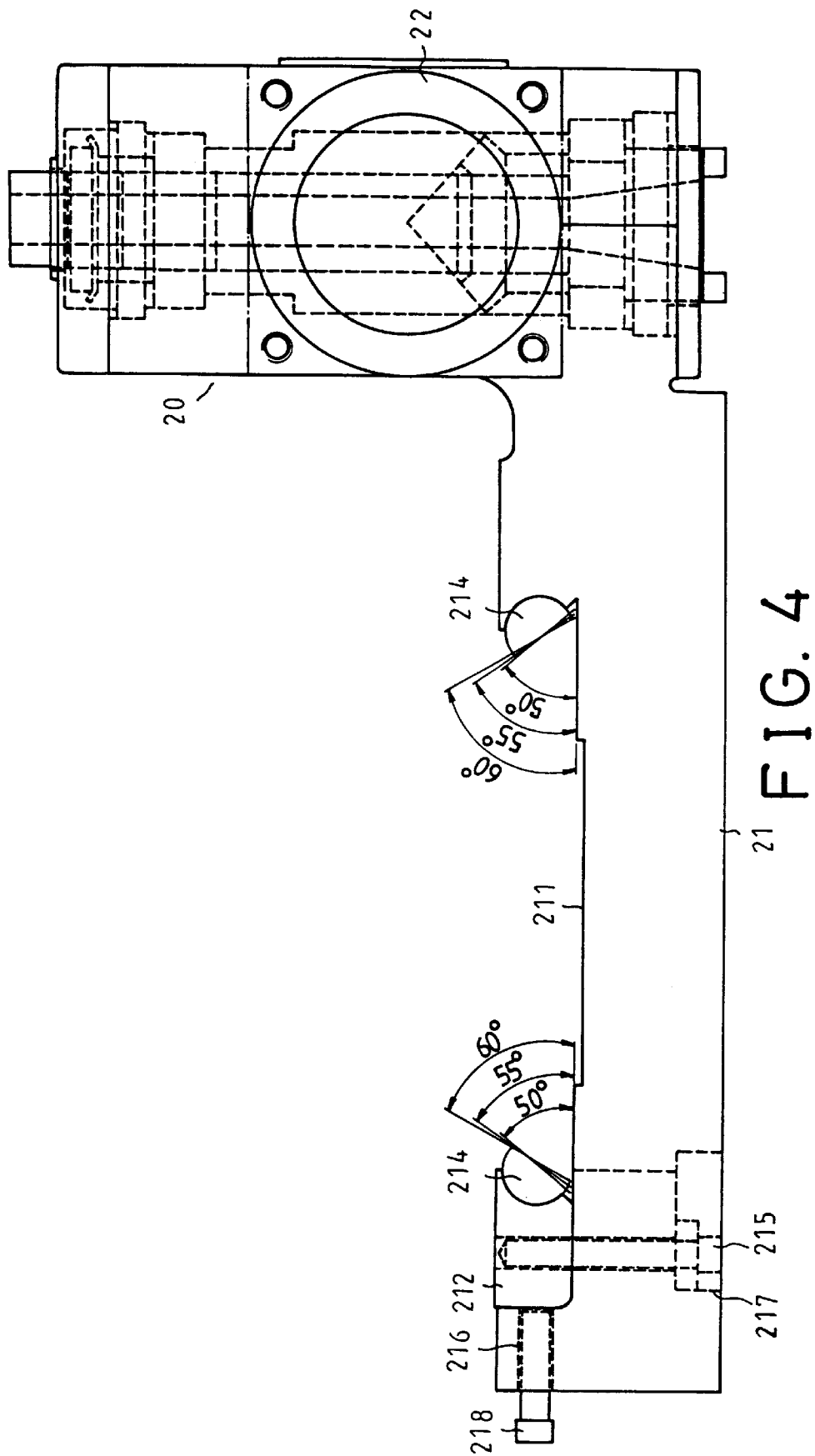
FIG. 4 is a top plane view of transmission mechanism.

A transmission mechanism 20 includes a block 21 having a slot 211 for slidably engaging with the track 111 and for allowing the block 21 to be adjusted up and down. The block 21 includes a curved recess 213 formed in one end of the slot 211 for rotatably engaging with a first follower 214 which includes a curved portion 2141 for rotatably engaging with the curved recess 213 and for allowing the first follower 214 to be rotated relative to the block 21. A slide 212 is slidably engaged in the other end of the slot 211 and includes a curved recess 213 formed in one end for rotatably engaging with a second follower 214 which also includes a curved portion for rotatably engaging with the curved recess 213 and for allowing the second follower 214 to be rotated relative to the slide 212 and the block 21. The block 21 includes one or more oblong holes 215 for engaging with fasteners 217 which are secured to the slide 212 and for allowing the slide 212 to be moved laterally toward the first follower 214. The block 21 includes one or more screw holes 216 for engaging with bolts 218 which are engaged with the slides 212 for forcing the slide 212 toward the first follower 214, and for securing the block 21 to the track 111 of the base 11. The followers 214 may be adjusted to different angular positions according to the side portions of the track 111 (FIG. 4) such that the block 21 may be secured to various kinds of tracks 111 having different side portions.

A housing 22 is provided on one end of the block 21 and includes a vertical rod 224 and a horizontal rod 225 each having a worm gear 226, 227 engaged with the other for allowing the horizontal rod 225 to be rotated by the vertical rod 224. A wheel or pulley 221 is secured on top of the vertical rod 224 for engaging with the belt 17 (FIG. 2) and for allowing the motor 14 to drive and to rotate the pulley 221. A tool 222 is secured to one end of the horizontal rod 225 for allowing the tool to be selectively driven and rotated by the motor 14. A chuck may also be secured to the horizontal rod 225 for engaging with the tool.

In operation, as shown in FIG. 2, when the tool 18 (FIG. 1) is removed from the chuck 15 and when the pulley 16 is secured to the chuck 15 for engaging with the belt 17, the belt 17 may be engaged with the pulley 221 for selectively driving and rotating the chuck 222 and the tool secured to the chuck 222 and for allowing the tool to machine the side portion of the work piece. The work piece may be moved toward the tool by the slidable working table 13.

Figure 5:
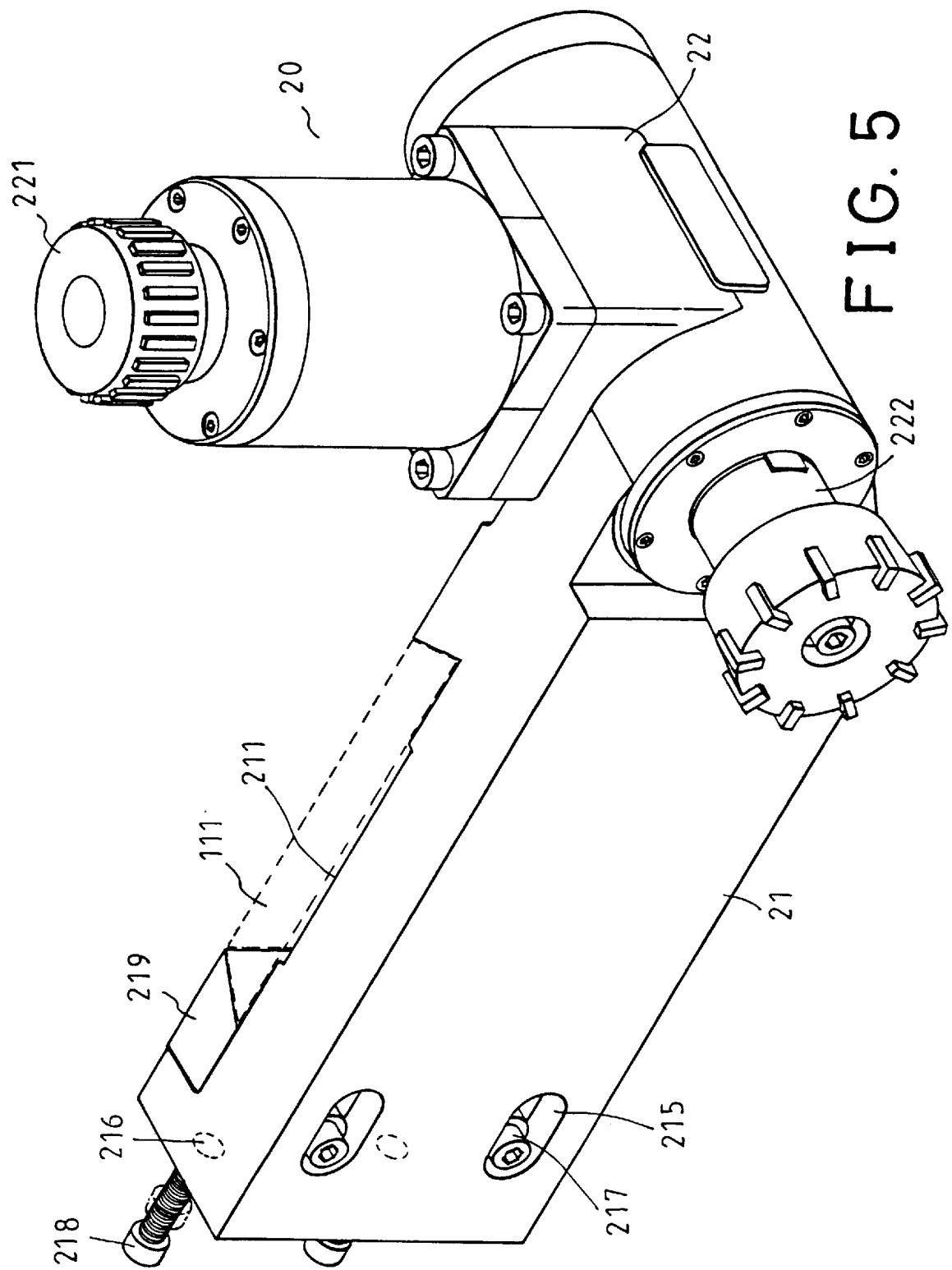
FIG. 5 is a perspective view showing another application of the transmission mechanism.

Referring next to FIG. 5, alternatively, without the followers 214, the slide 219 may be forced, by the bolts 218, to engage with the typical track 111 which normally includes a 45° inclination.

Figure 6:
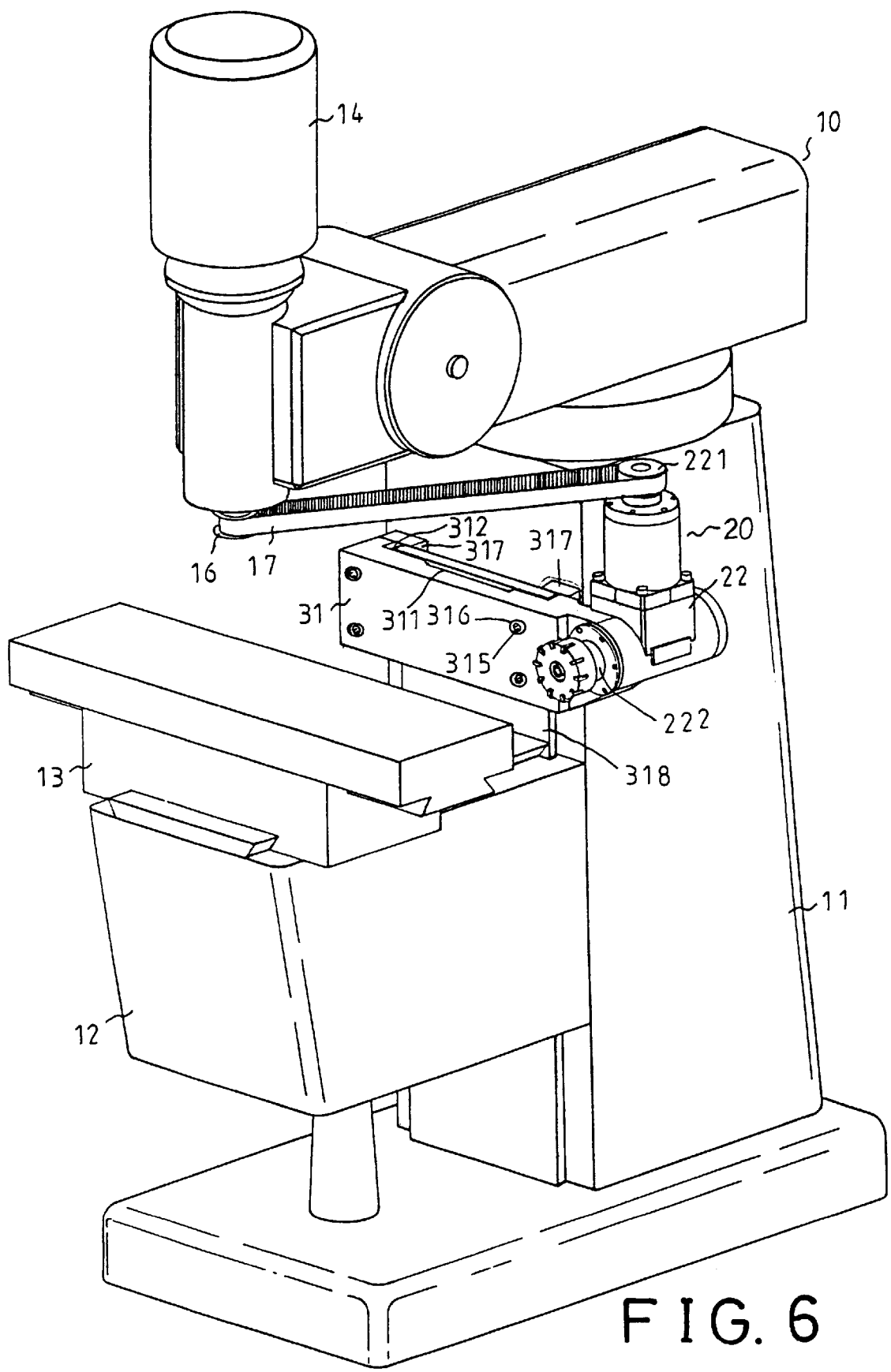
FIGS. 6, 7, 8 are perspective views illustrating the other application of the transmission mechanism.
Figure 7:
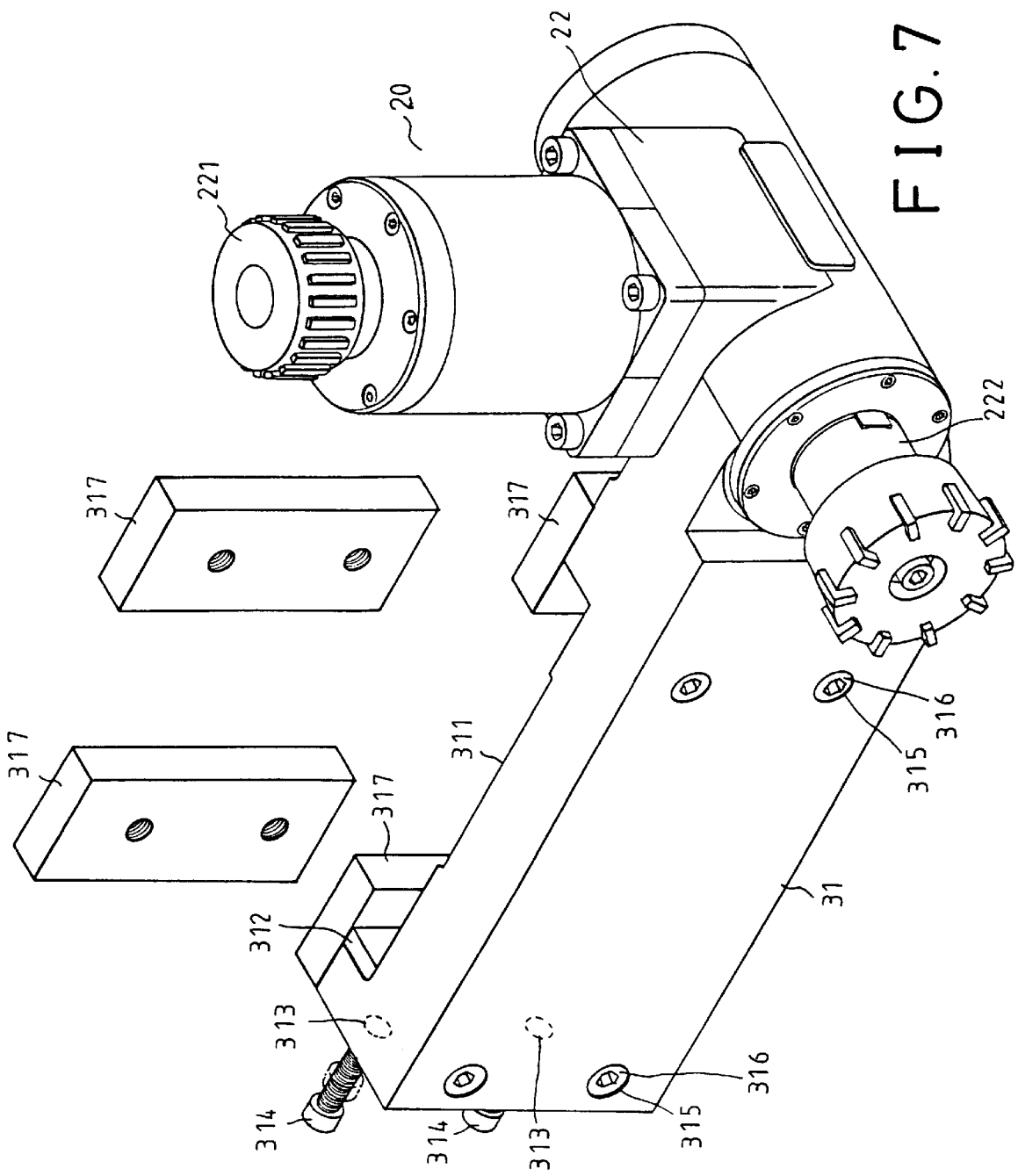
Figure 8:
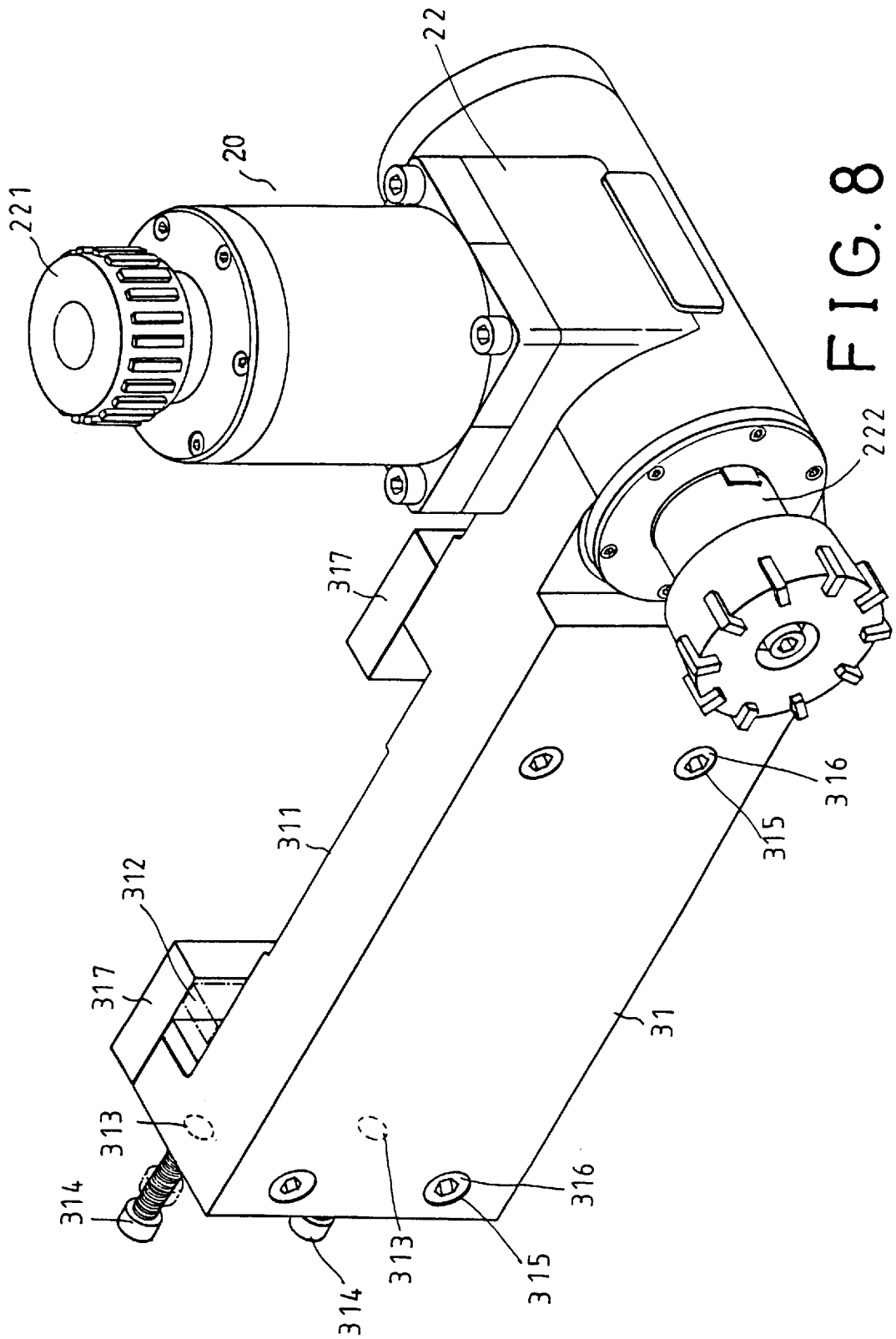

Referring next to FIGS. 6–8, the block 31 may include a number of holes 315 for engaging with fasteners 316 which may secure two fences 317 to the block 31 for forming a slot 311 having a rectangular cross section. A slide 312 is slidably engaged in one end of the slot 311. One or more screw holes 313 are formed in the block 31 for engaging with fasteners 314 which may engage with the slide 312 for forcing the slide 312 to engage with the track 318 having a rectangular cross section. The block 31 may thus be attached to the working machine having the rectangular track 318. The chuck 222 may also be used for securing a tool and for allowing the tool to be selectively driven and rotated to machine the side portion of the work piece.

Accordingly, the working machine in accordance with the present invention includes another tool for selectively machining the side portion of the work piece.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A working machine comprising:

a base including a working table for supporting a work piece and including a first tool provided on top and adapted to move downward for machining the work piece, means for actuating said first tool to machine the work piece, said actuating means including a motor provided on said top of said base and including a securing member coupled to said motor for securing said first tool and for allowing said first tool to be actuated by said motor, a block secured to said base and including a housing, said housing including a second tool, and said housing including a horizontal rod for securing said second tool and including a vertical rod coupled to said horizontal rod for allowing said vertical rod to rotate said horizontal rod, and means for selectively driving said second tool and for allowing said second tool to machine a side portion of the work piece, said selectively driving means being provided for driving said vertical rod and including a first pulley for securing to said securing member of said actuating means and including a second pulley secured to said vertical rod and including means for coupling said first pulley and said second pulley and for allowing said second tool to be driven by said motor.

2. A working machine according to claim 1, wherein said base includes a front portion having a vertical track, said block includes a slot for slidably engaging with said vertical track and for allowing said block to be adjusted upward and downward.

3. A working machine comprising:

a base including a working table for supporting a work piece and including a first tool provided on top and adapted to move downward for machining the work piece, said base including a front portion having a vertical track, means for actuating said first tool to machine the work piece, a block secured to said base and including a housing, said housing including a second tool, said block including a slot for slidably engaging with said vertical track and for allowing said block to be adjusted upward and downward and means for selectively driving said second tool and for allowing said second tool to machine a side portion of the work piece, said slot including a first end and a second end, said block including a slide slidably engaged in said second end of said slot, and means for forcing said slide toward said first end of said slot and for securing said block to said vertical track.

4. A working machine according to claim 3, wherein said block includes two followers rotatably engaged in said slide and said first end of said slot for engaging with said vertical track and for allowing said block to be secured to different vertical tracks.

5. A working machine according to claim 4, wherein said slide and said block each includes a curved recess, said followers each includes a curved portion for engaging with said curved recesses and for allowing said followers to be rotated relative to said block.

* * * * *